United States Patent
Yilmaz et al.

(10) Patent No.: US 11,822,165 B1
(45) Date of Patent: Nov. 21, 2023

(54) DISPLAYS WITH ADJUSTABLE ANGLES OF VIEW

(71) Applicant: Apple Inc., Cupertino, CA (US)

(72) Inventors: Cihan Yilmaz, Los Gatos, CA (US); Supriya Goyal, San Jose, CA (US); Shih-Chyuan Fan Jiang, San Jose, CA (US); Paul V. Johnson, San Francisco, CA (US); Se Hyun Ahn, Cupertino, CA (US); Cheng Chen, San Jose, CA (US); Yuan Chen, San Jose, CA (US); Hyungryul Choi, San Jose, CA (US); Zhibing Ge, Los Altos, CA (US); Christiaan A. Ligtenberg, San Carlos, CA (US); Dinesh C. Mathew, San Francisco, CA (US); Hyunmin A. Song, San Jose, CA (US); Chaohao Wang, Sunnyvale, CA (US); Jiaying Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 16/875,891

(22) Filed: May 15, 2020

Related U.S. Application Data

(63) Continuation-in-part of application No. 16/261,408, filed on Jan. 29, 2019, now Pat. No. 11,448,908.
(Continued)

(51) Int. Cl.
*G02F 1/13* (2006.01)
*G02F 1/163* (2006.01)
(Continued)

(52) U.S. Cl.
CPC ........ *G02F 1/1323* (2013.01); *G02F 1/13439* (2013.01); *G02F 1/155* (2013.01);
(Continued)

(58) Field of Classification Search
CPC .. G02F 1/1323; G02F 1/1524; G02F 1/13439; G02F 1/1525; G02F 1/155; G02F 1/163
See application file for complete search history.

(56) References Cited

U.S. PATENT DOCUMENTS

| | | | |
|---|---|---|---|
| 2009/0067156 A1 | 3/2009 | Bonnett et al. | |
| 2010/0328751 A1* | 12/2010 | Kondou | G02F 1/155 427/64 |

(Continued)

FOREIGN PATENT DOCUMENTS

| | | |
|---|---|---|
| GB | 2426352 | 11/2006 |
| GB | 2457693 | 8/2009 |

(Continued)

*Primary Examiner* — Nathanael R Briggs
(74) *Attorney, Agent, or Firm* — Treyz Law Group, P.C.; Kendall P. Woodruff

(57) ABSTRACT

A display may have display layers that form an array of pixels. An angle-of-view adjustment layer may overlap the display layers. The angle-of-view adjustment layer may include an array of adjustable light blocking structures formed from electrochromic material. The electrochromic material may be interposed between first and second electrode layers. When it is desired to operate the display in a private viewing mode, control circuitry may apply a current to the first and second electrodes that causes the electrochromic material to become more opaque, thereby restricting the angle of view of the display. When it is desired to operate the display in a public viewing mode, control circuitry may apply a current to the first and second electrodes that causes the electrochromic material to become more transparent, thereby opening up the angle of view of the display.

17 Claims, 15 Drawing Sheets

Related U.S. Application Data

(60) Provisional application No. 62/624,647, filed on Jan. 31, 2018.

(51) Int. Cl.
*G02F 1/1523* (2019.01)
*G02F 1/1343* (2006.01)
*G02F 1/1524* (2019.01)
*G02F 1/155* (2006.01)

(52) U.S. Cl.
CPC .......... *G02F 1/1524* (2019.01); *G02F 1/1525* (2013.01); *G02F 1/163* (2013.01)

(56) References Cited

U.S. PATENT DOCUMENTS

| | | |
|---|---|---|
| 2011/0018860 A1 | 1/2011 | Parry-Jones et al. |
| 2014/0110040 A1 | 4/2014 | Cok |
| 2015/0109674 A1 | 4/2015 | Cok |
| 2015/0131139 A1* | 5/2015 | Tsukamoto ............. G02F 1/155 |
| | | 359/266 |
| 2017/0108628 A1* | 4/2017 | Larsen ................... G02B 5/003 |
| 2018/0359461 A1 | 12/2018 | Koerber et al. |
| 2019/0162990 A1* | 5/2019 | Nishimura .............. G02F 1/167 |

FOREIGN PATENT DOCUMENTS

| | | | |
|---|---|---|---|
| KR | 1357041 B1 * | 2/2014 | |
| WO | 2012162458 | 11/2012 | |
| WO | WO-2014164257 A1 * | 10/2014 | ........... G02F 1/1323 |

* cited by examiner

DISPLAYS WITH ADJUSTABLE ANGLES OF VIEW

This application is a continuation-in-part of patent application Ser. No. 16/261,408, filed Jan. 29, 2019, which claims the benefit of provisional patent application No. 62/624,647, filed Jan. 31, 2018, both of which are hereby incorporated by reference herein in their entireties.

FIELD

This relates generally to electronic devices and, more particularly, to electronic devices with displays.

BACKGROUND

Electronic devices often include displays. For example, laptop computers have displays. Displays are typically designed to display images over a relatively wide angle of view to accommodate movements in the position of a viewer relative to the display. In some situations, such as when a user of a laptop or other device with a display is using the device in public, the wide viewing angle is undesirable as it compromises privacy.

SUMMARY

A display may have display layers such as liquid crystal display layers having a liquid crystal layer interposed between a color filter layer and a thin-film transistor layer, organic light-emitting diode layers having organic light-emitting diodes formed from thin-film transistor circuitry, or other types of display layers.

An angle-of-view adjustment layer may overlap the display layers. The angle-of-view adjustment layer may include an array of adjustable louvers that move from a first position in which the angle of view of the display is restricted for a private viewing mode and a second position in which the angle of view of the display is not restricted for a normal viewing mode. The louvers may contain electrophoretic particles. The louvers may be tapered and may have a narrow end that is less than ten microns wide to increase transmittance in normal viewing mode. The electrophoretic particles may form isolated clusters on a lower substrate in normal viewing mode to further increase the transmittance of the display in normal viewing mode.

In some arrangements, the angle-of-view adjustment layer may include adjustable light blocking structures formed from electrochromic material. The electrochromic material may be a patterned coating of electrochromic material that is interposed between first and second electrode layers. When it is desired to operate the display in a private viewing mode, control circuitry may apply a current to the first and second electrodes that causes the electrochromic material to become more opaque, thereby restricting the angle of view of the display. When it is desired to operate the display in a public viewing mode, control circuitry may apply a current to the first and second electrodes that causes the electrochromic material to become more transparent, thereby opening up the angle of view of the display to a larger range of angles.

DETAILED DESCRIPTION

Figure 1:
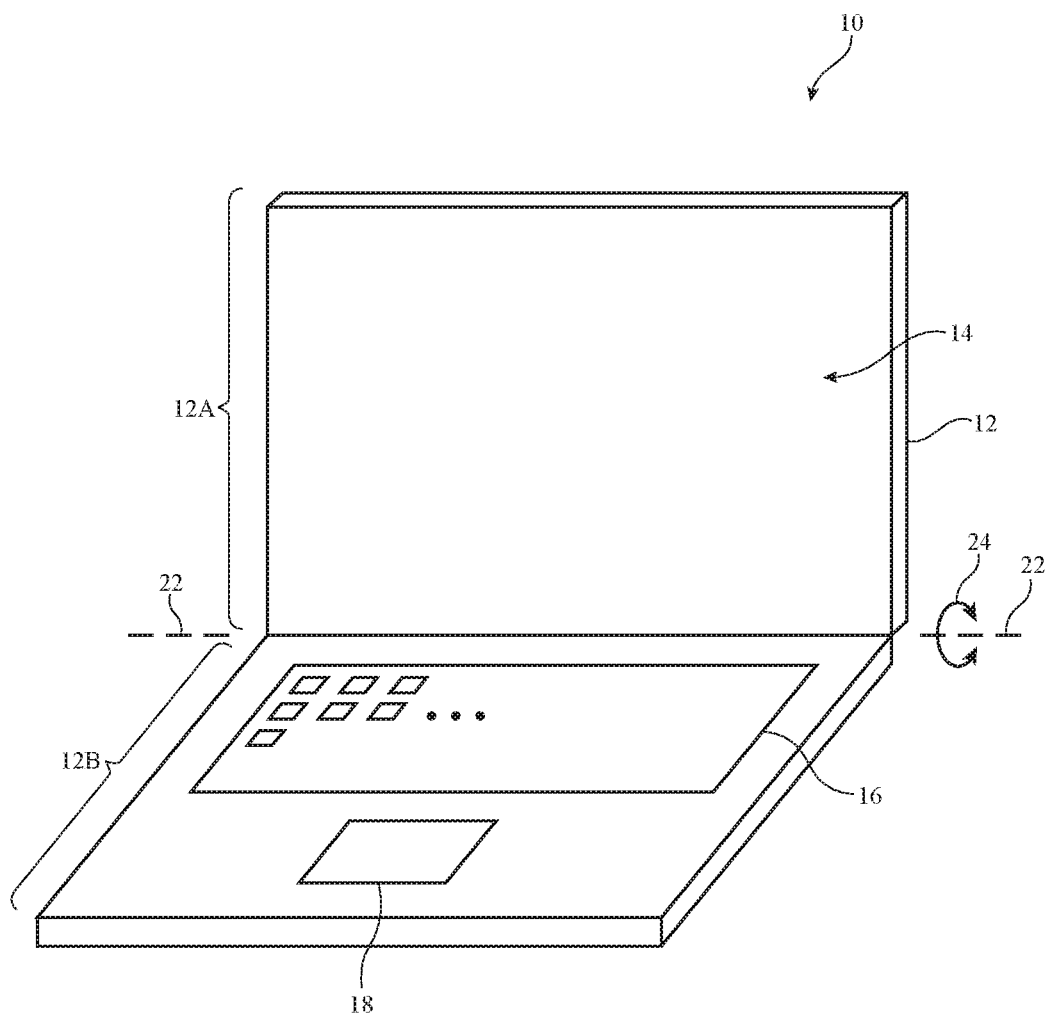
FIG. 1 is a perspective view of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, or other wearable or miniature device, a computer display that does not contain an embedded computer, a computer display that includes an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a laptop computer. Other configurations may be used for device 10 if desired. The example of FIG. 1 is merely illustrative.

As shown in FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Housing portions 12A and 12B of housing 12 may be connected to each other using hinge structures located along the upper edge of lower housing 12B and the lower edge of upper housing 12A. Hinges may allow upper housing 12A to rotate about axis 22 in directions 24 relative to lower housing 12B.

Display 14 may be mounted in upper housing 12A. Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. A touch sensor may be formed using electrodes or other structures on a display layer that contains a pixel array or on a separate touch panel layer that is attached to the pixel array (e.g., using adhesive).

Display 14 may include an array of pixels formed from liquid crystal display (LCD) components, an array of electrophoretic pixels, an array of electrowetting pixels, an array of organic light-emitting diode pixels, or pixels based on other display technologies.

As shown in FIG. 1, device 10 may have input-output devices such as track pad 18 and keyboard 16. Device 10 may also have components such as cameras, microphones, speakers, buttons, status indicator lights, buzzers, sensors, and other input-output devices. These devices may be used to gather input for device 10 and may be used to supply a user of device 10 with output. Connector ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.).

Figure 2:
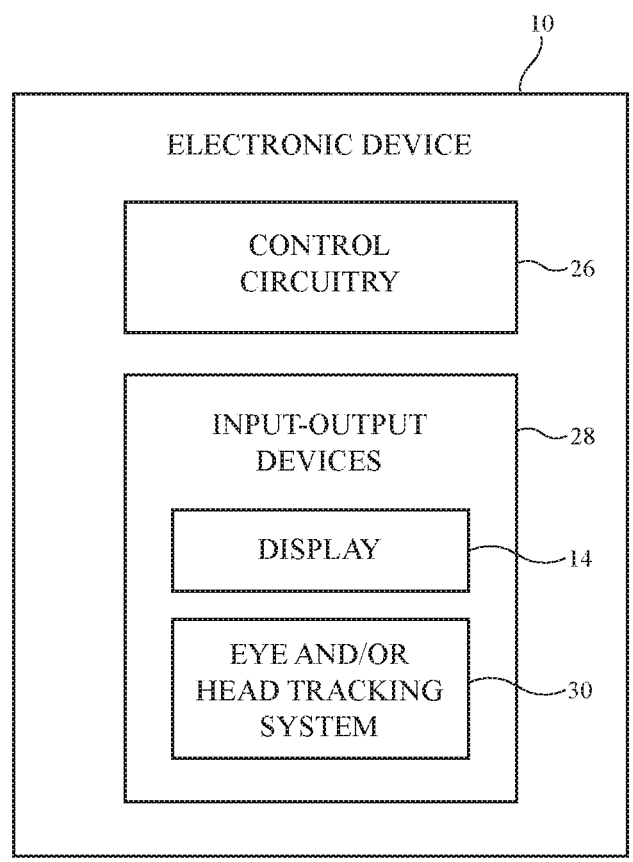
FIG. 2 is a schematic diagram of an illustrative electronic device having a display in accordance with an embodiment.

FIG. 2 is a schematic diagram of device 10. As shown in FIG. 2, electronic device 10 may have control circuitry 26. Control circuitry 26 may include storage and processing circuitry for supporting the operation of device 10. The storage and processing circuitry may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 26 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 28 may be used to allow data to be supplied to device 10 and to allow data to be provided from device 10 to external devices. Input-output devices 28 may include buttons, joysticks, scrolling wheels, touch pads, key pads, keyboards, microphones, speakers, tone generators, vibrators, cameras, sensors (e.g., ambient light sensors, proximity sensors, orientation sensors, magnetic sensors, force sensors, touch sensors, etc.), light-emitting diodes and other status indicators, data ports, etc. A user can control the operation of device 10 by supplying commands through input-output devices 28 and may receive status information and other output from device 10 using the output resources of input-output devices 28. Input-output devices 28 may include one or more displays such as display 14.

Control circuitry 26 may be used to run software on device 10 such as operating system code and applications. During operation of device 10, the software running on control circuitry 26 may display images on display 14 using an array of pixels in display 14. Display 14 may include adjustable viewing angle control structures such as an adjustable angle-of-view adjustment layer that overlaps the pixels and/or an adjustable backlight. The angle-of-view adjustment layer can be operated in a wide viewing angle mode when privacy is not needed and can be operated in one or more narrow viewing angle modes when privacy is desired.

When operated in the restricted angle-of-view mode (sometimes referred to as privacy mode), the angle of view of display 14 is restricted. When the angle of view of display 14 is restricted, it is difficult or impossible for viewers that are located at off-axis positions relative to display 14 to view images on display 14 (e.g., a viewer seated next to the user on an airplane will not be able to view images on display 14). At the same time, the user of device 10 who is located in an on-axis position will be able to use display 14 to view images. When operated in an unrestricted angle-of-view mode (sometimes referred to as wide viewing angle mode or normal operation), both on-axis and off-axis viewers will be able to view content on display 14 (i.e., content will not generally be private).

Changes in the operating mode of display 14 to implement angle-of-view restrictions (i.e., adjustments to display 14 to place display 14 in normal viewing mode or a reduced-angle-of-view privacy mode) may be made based on user input to input-output devices 28 or may be made automatically by control circuitry 26. Control circuitry 26 may, for example, use information such as content sensitivity information to determine whether or not content that is being display on display 14 should be displayed in normal mode or privacy mode. If, for example, a user is viewing a movie, the movie may be displayed in normal mode. In the event that a private message such as an incoming text message is detected, display 14 may be placed in privacy mode, thereby ensuring that the content of the text message will not be inadvertently revealed to unauthorized parties. If desired, the angle-of-view adjustment layer for display 14 may be segmented (e.g., using individually adjustable segmented electrodes), so that only a part of display 14 may be placed in privacy mode (e.g., to ensure the privacy of a text message) while the remainder of display 14 is operated normally (e.g. to display a movie).

Device 10 may include cameras and other components that form part of gaze and/or head tracking system 30. The camera(s) or other components of system 30 may face a user's eyes and may track the user's eyes and/or head (e.g., images and other information captured by system 30 may be analyzed by control circuitry 26 to determine the location of the user's eyes and/or head). This eye-location information obtained by system 30 may be used to determine the appropriate direction with which display content from display 14 should be directed. For example, if display 14 is operated in privacy mode using an angle-of-view adjustment layer that restricts the viewing area to a particular region, eye-location information from system 30 may be used to determine the appropriate viewing region and adjust accordingly if the user's head location changes relative to display 14. If desired, image sensors other than cameras (e.g., infrared and/or visible light-emitting diodes and light detectors, etc.) may be used in system 30 to monitor a user's eye and/or head location.

Figure 3:
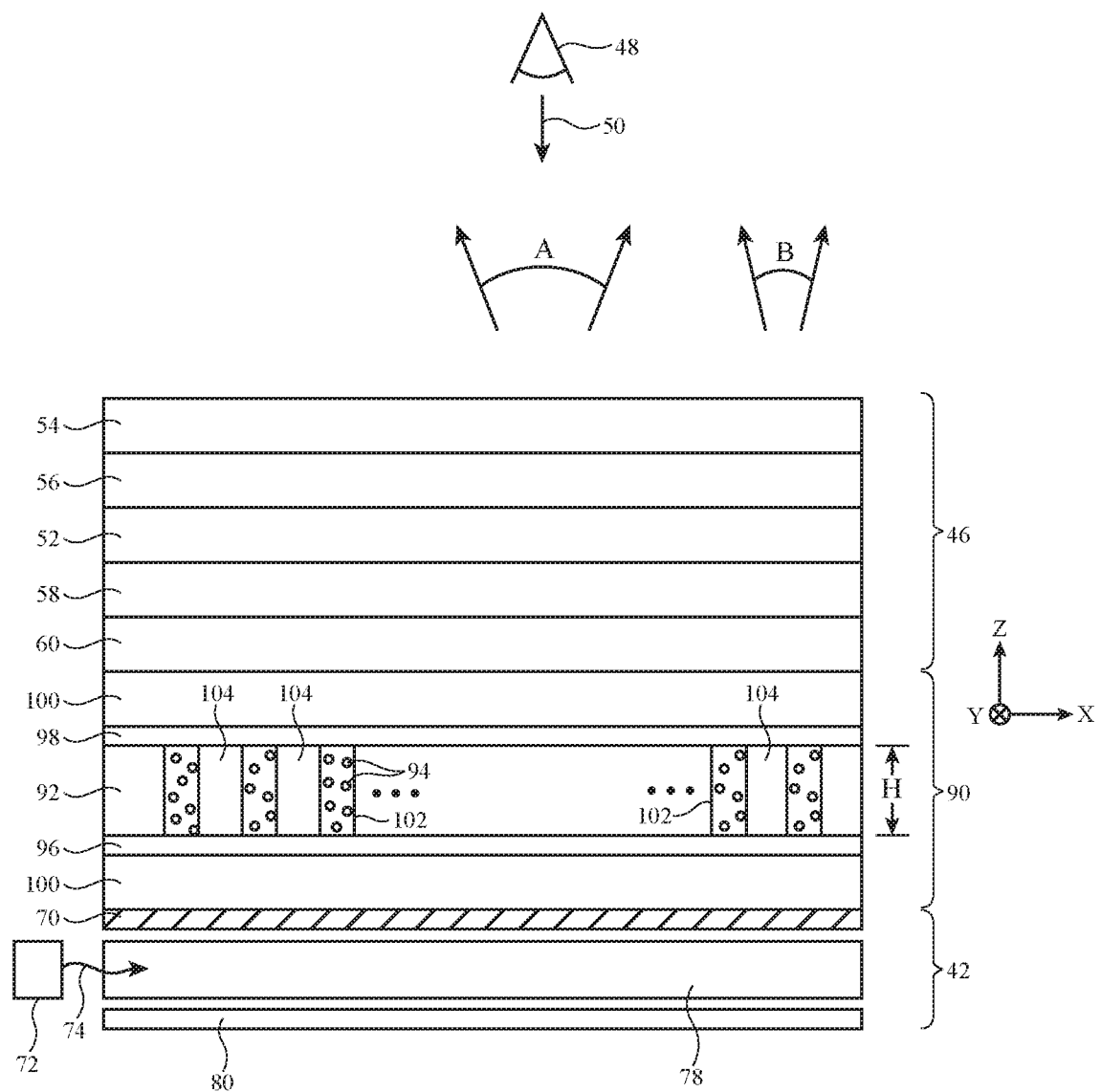
FIG. 3 is a cross-sectional side view of an illustrative display having an angle-of-view adjustment layer in accordance with an embodiment.

A cross-sectional side view of display 14 is shown in FIG. 3. Display 14 may have a rectangular shape (i.e., display 14 may have a rectangular footprint and a rectangular peripheral edge that runs around the rectangular footprint) or may have other suitable shapes. Display 14 may be planar, as shown in FIG. 3, or may have a curved profile. An adjustable angle-of-view control layer such as angle-of-view adjustment layer 90 may overlap the footprint of display 14. Angle-of-view adjustment layer 90 may have one or more electrically adjustable structures that control circuitry 26 can control dynamically to place display 14 in a normal viewing mode or a private viewing mode. Layer 90 may, for example, be a light modulator layer formed from light modulator components such as one or more electrophoretic light blocking structures (as shown in the example of FIG. 3), one or more electrochromic devices (e.g., electrochromic material formed from particles, gel, or dye that exhibits a chromic effect and that changes its color and light transmission characteristics such as opacity when placed in a different electronic state by redox reactions), and/or other light modulator components that can be adjusted to produce a variable amount of viewing angle restriction (adjustable privacy) based on user input, input from sensors, information on the nature of which content is being presented on display 14, etc.

An electrochromic device (e.g., in layer 90) may have a pair of transparent electrodes. An electrolyte such as LiNiOP (e.g., a gel electrolyte) may be interposed between one or more electrochromic coatings on the electrodes. The coatings may be, for example, a $Li_xNiO$ coating on a first of the electrodes and a tungsten oxide ($WO_3$) coating on a second of the electrodes. The electrodes may be used to apply a current to the electrochromic coatings to either darken (color) or lighten (discolor) the electrochromic material.

As shown in FIG. 3, display 14 may include backlight structures such as backlight unit 42 for producing backlight illumination such as backlight illumination (backlight) 44. During operation, backlight illumination 44 travels outwards (vertically upwards in dimension Z in the orientation of FIG. 3) and passes through an array of pixels in display layers 46. This illuminates any images that are being produced by the pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). In the example of FIG. 3, display layers 46 are liquid crystal display layers and include a liquid crystal layer such as layer 52 (e.g., a layer of liquid crystal molecules sandwiched between a pair of conductive transparent electrodes and polyimide alignment layers). If desired, display layers 46 may be formed from other types of display structures such as light-emitting diode display structures or micro-LED display structures (e.g., an array of discrete light-emitting diodes each of which is formed from a crystalline semiconductor die). In general, display layers 46 may be formed from any suitable type of display (e.g., an electrophoretic display, a plasma display, a display formed from microelectromechanical systems pixels, etc.).

In a liquid crystal display, display layers 46 may include a liquid crystal layer such a liquid crystal layer 52. Liquid crystal layer 52 may be sandwiched between display layers such as display layers 56 and 58. Layers 56 and 58 may be interposed between lower polarizer layer 60 and upper polarizer layer 54.

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer in the upper or lower portion of display 14 may also be used. Layers 46 may form any suitable type of liquid crystal display (e.g., a fringe-field switching display, a vertical alignment liquid crystal display, a twisted nematic liquid crystal display, an in-plane switching liquid crystal display, an electrically controlled birefringence liquid crystal display, etc.).

During operation of display 14 in device 10, control circuitry 26 (e.g., one or more integrated circuits on a printed circuit) may be used to generate information to be displayed on display 14 (e.g., display data). The information to be displayed may be conveyed to one or more display driver integrated circuits. The display driver circuits may supply data and control signals to an array of pixels in display layers 46 (e.g., pixel circuits in layer 58, etc.).

Backlight structures 42 may include a light guide layer such as light guide layer 78 (sometimes referred to as a light guide structure or light guide). Light guide layer 78 may be formed from one or more stacked layers of transparent material such as clear glass or plastic (e.g., molded plastic that forms a light guide plate, a thin flexible plastic film, etc.). During operation of backlight structures 42, light sources such as light source 72 may generate light that creates backlight 44. Light source 72 may be an array of light-emitting diodes that runs along one or more edges of light guide layer 78 such as edge 76 of light guide layer 78 (i.e., into the page along the Y axis in the orientation of FIG. 3). Light-source 72 may emit light 74 into edge 76 of light guide layer 78.

Light 74 may be distributed throughout light guide layer 78 due to the principal of total internal reflection. Scattering features (protrusions, recesses, etc.) may be incorporated into light guide layer 78 (e.g., on the upper and/or lower surface of layer 78) to scatter light from layer 78. Light that is scattered upwards in direction Z from light guide layer 78 may serve as backlight 44 for display 14. Light that scatters downwards may be reflected back in the upwards direction by reflector 80. Reflector 80 may be formed from a reflective material such as a layer of plastic covered with a dielectric mirror thin-film coating.

To enhance display performance, optical films 70 may be incorporated between backlight structures 42 and layers 46. Optical films 70 may include diffuser layers for helping to homogenize backlight 44 and thereby reduce hotspots, light collimating films such as prism films (sometimes referred to as brightness enhancement films), polarization recycling films, turning films for directing backlight 44 towards direction Z, and compensation films for enhancing off-axis viewing. Optical films 70 may overlap the other structures in backlight unit 42 such as light guide layer 78 and reflector 80. For example, if light guide layer 78 has a rectangular footprint in the X-Y plane of FIG. 3, optical films 70 and reflector 80 may have a matching rectangular footprint. If desired, films such as compensation films may be incorporated into other layers of display 14 (e.g., a polarizer layer).

Angle-of-view adjustment layer 90 may be operated in multiple viewing modes such as a normal angle-of-view mode and one or more reduced angle-of-view modes. When operated in a normal angle-of-view mode, viewer 48 can view images on display 14 over a relatively wide range of angles A. When privacy is desired, display 14 can be operated in the reduced angle-of-view mode. In this mode, viewer 48 can view images on display 14 over a more restricted range of angles (see, e.g., reduced angle-of-view range B, where B<A, B<60% of A, where B<40% of A, etc.).

As shown in FIG. 3, layer 90 may include one or more light adjustment layers such as light transmission adjustment layer 92 interposed between transparent electrodes 96 and 98. Control circuitry 26 may control the operation of layer 90 by applying controlled amounts of electric field to layer 92 using electrodes 96 and 98. Electrodes 96 and 98 may be formed from transparent conductive material such as indium tin oxide and may be supported by transparent planar members such as clear substrates 100 (e.g., glass, plastic, etc.). Polarizer layers and/or other layers in display 14 may also serve as substrates for electrodes 96 and 98. The use of substrates 100 to support electrodes 96 and 98 in FIG. 3 is merely illustrative. Electrodes 96 and 98 may be blanket conductive layers or one or both of electrodes 96 and 98 may be patterned.

Light transmission adjustment layer 92 may include light blocking structures 102 interspersed with light transmissive structures 104. Light transmissive structures 104 (sometimes referred to as transparent polymer 104) may be an optically clear material such as acrylic or other transparent polymer. In the example of FIG. 3, light blocking structures 102 include particles 94 (e.g., charged electrophoretic particles of dark ink such as carbon black ink) suspended in fluid or other transparent medium 108. In other arrangements, light blocking structures 102 may be formed from electrochromic materials that change color (e.g., that transition between white and black) and/or that change opacity (e.g., that transition between opaque and transparent) in response to an applied current. Illustrative examples of electrochromic devices that may be used in layer 90 are described in more detail in connection with FIGS. 27, 28, and 29. However, it should be understood that any of the light blocking structures described in connection with FIGS. 3-29 may be formed with electrochromic materials that may be selectively darkened when display 14 is operated in a private viewing mode and lightened when display 14 is operated in a public viewing mode.

Light blocking structures 102 may serve as electrically controllable louvers for restricting the angle of view of display 14. When display 14 switches into private viewing mode, control circuitry 26 may remove the electric field applied to layer 92, causing particles 94 to disperse throughout medium. As shown in the example of FIG. 3, light blocking structures 102 may have a first height such as height H when operated in private viewing mode to block off-axis light at wide viewing angles. When display 14 is operated in a normal viewing mode, control circuitry 26 may apply a voltage across electrodes 96 and 98, creating an electric field in layer 92 that causes particles 94 to move towards the electrode having an opposite charge from that of particles 94. For example, in arrangements where lower electrode 96 has opposite charge from that of particles 94, light blocking structures 102 may collapse towards lower electrode 96 to a height that is less than height H to allow off-axis light at wide viewing angles to exit display 14.

In the example of FIG. 3, angle-of-view adjustment layer 90 is laminated between lower polarizer 60 and optical films 70. This type of arrangement may ensure that optical films 70 are able to efficiently recycle light from backlight 42. This is, however, merely illustrative. If desired, angle-of-view adjustment layer 90 may be interposed between optical films 70 and light guide layer 78, may be located above upper polarizer 54, or may be located in other suitable locations in display 14.

Figure 4:
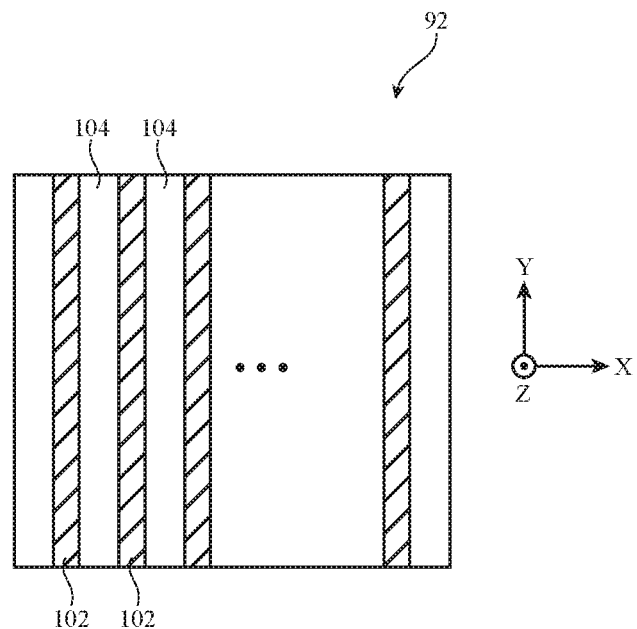
FIG. 4 is a top view of an illustrative angle-of-view adjustment layer having adjustable light blocking structures that extend along a first direction in accordance with an embodiment.

FIG. 4 is a top view of an illustrative arrangement for light transmission adjustment layer 90 in which light blocking structures 102 are formed in parallel strips that extend along a first direction (e.g., along the Y direction, as shown in the example of FIG. 4, or along the X direction). Layer 92 of FIG. 4 may be formed from a layer of transparent polymer 104 that has been embossed or photolithographically patterned to form elongated trenches in transparent polymer 104. The trenches may be filled with light blocking structures 102 (e.g., black ink particles 94 suspended in a transparent medium 108, electrochromic material, etc.). Arrangements of the type shown in FIG. 4 are sometimes referred to as one-dimensional louvers because light blocking structures 102 are configured to restrict the horizontal field of view (e.g., the field of view along dimension X of FIG. 4).

Figure 5:
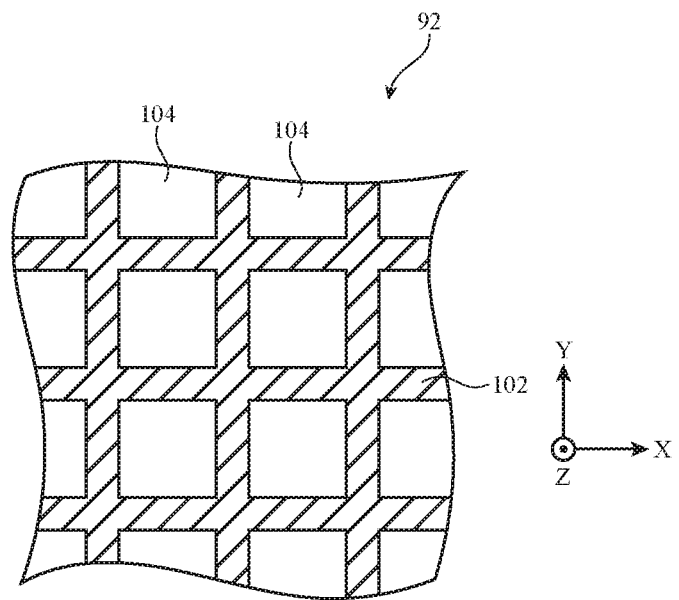
FIG. 5 is a top view of an illustrative angle-of-view adjustment layer having adjustable light blocking structures that extend along first and second directions in accordance with an embodiment.

FIG. 5 is a top view of an illustrative arrangement for adjustable light transmission layer 92 in which light blocking structures 102 are formed in a rectangular grid that extends along first and second directions (e.g., along the X and Y directions of FIG. 5). Layer 92 of FIG. 5 may be formed from a layer of transparent polymer 104 that has been embossed or photolithographically patterned to form a grid of trenches in transparent polymer 104. The trenches may be filed with light blocking structures 102 (e.g., black ink particles suspended in transparent medium 108, electrochromic material, etc.). As shown in FIG. 5, light blocking structures 102 may completely surround each transmissive polymer structure 104. Whereas transparent polymer structures 104 of FIG. 4 have a wall shape, transparent polymer structures 104 of FIG. 5 have a pillar shape and are sometimes referred to as micro-rods. Configurations of the type shown in FIG. 5 are sometimes referred to as two-dimensional louvers because light blocking structures 102 are configured to restrict the horizontal field of view (e.g., the field of view along dimension X of FIG. 5) and the vertical field of view (e.g., the field of view along dimension Z of FIG. 5).

Due to the presence of light blocking particles 94, care must be taken to ensure that transmittance is not significantly reduced when display 14 is operated in a normal wide viewing mode. FIGS. 6-24 show illustrative examples for configuring angle-of-view adjustment layer 90 so that light blocking particles 94 do not significantly affect transmittance when display 14 is operated in a normal viewing mode. These examples may be implemented with a one-dimensional louver arrangement of the type shown in FIG. 4 or a two-dimensional louver arrangement of the type shown in FIG. 5. Arrangements in which layer 90 includes a two-dimensional louver structure are sometimes described as an illustrative example.

Figure 6:
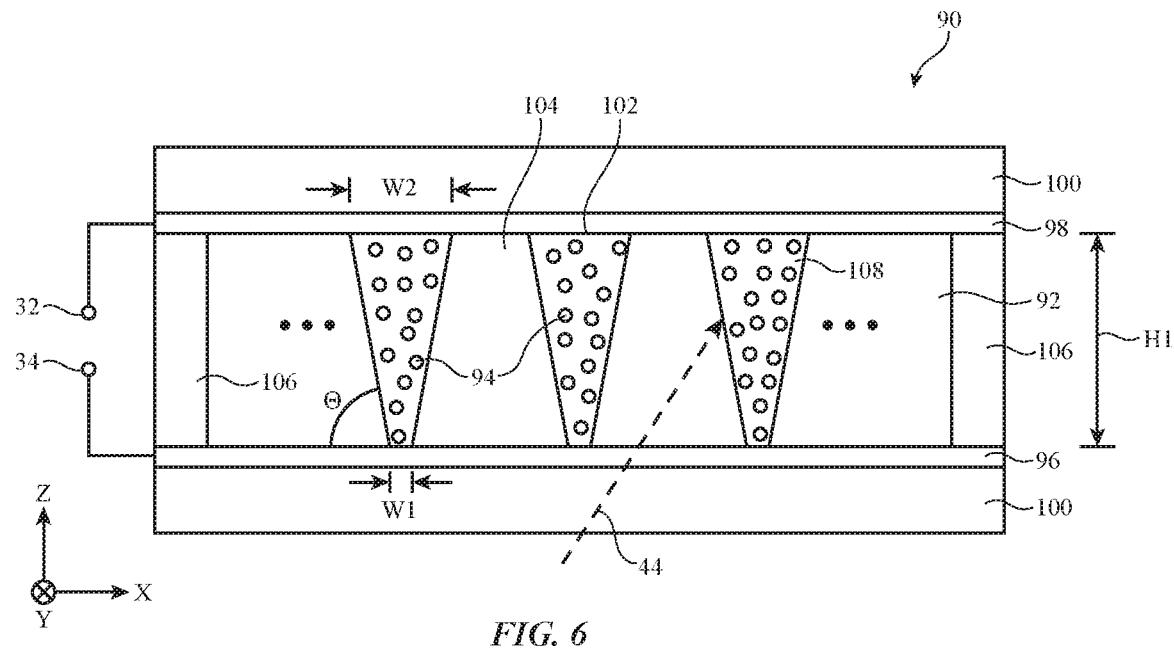
FIG. 6 is a cross-sectional side view of an illustrative angle-of-view adjustment layer having tapered light blocking structures that are positioned in a reduced angle-of-view state in accordance with an embodiment.

FIG. 6 is a cross-sectional side view of an illustrative angle-of-view adjustment layer 90 having tapered light blocking structures 102. As shown in FIG. 6, the width W1 at the lower surface of light blocking structures 102 may be smaller than the width W2 at the upper surface of light blocking structures 102. Width W1 may be about 5 microns, about 10 microns, between 5 and 10 microns, between 2 and 5 microns, between 3 and 14 microns, between 2 and 20 microns, greater than 10 microns, or less than 10 microns. The angle θ between the lower substrate 100 and the side surface of light blocking structure 102 may, for example, be about 85°, about 86°, about 84°, between 80° and 90°, between 85° and 95°, between 83° and 88°, greater than 88°, or less than 88°. When it is desired to operate display 14 in private mode, control circuitry 26 does not apply a voltage across terminal 32 (coupled to electrode 98) and terminal 34 (coupled to electrode 96). The absence of an electric field will cause particles 94 to disperse throughout medium 108, forming a light blocking structure 102 of height H1.

Figure 7:
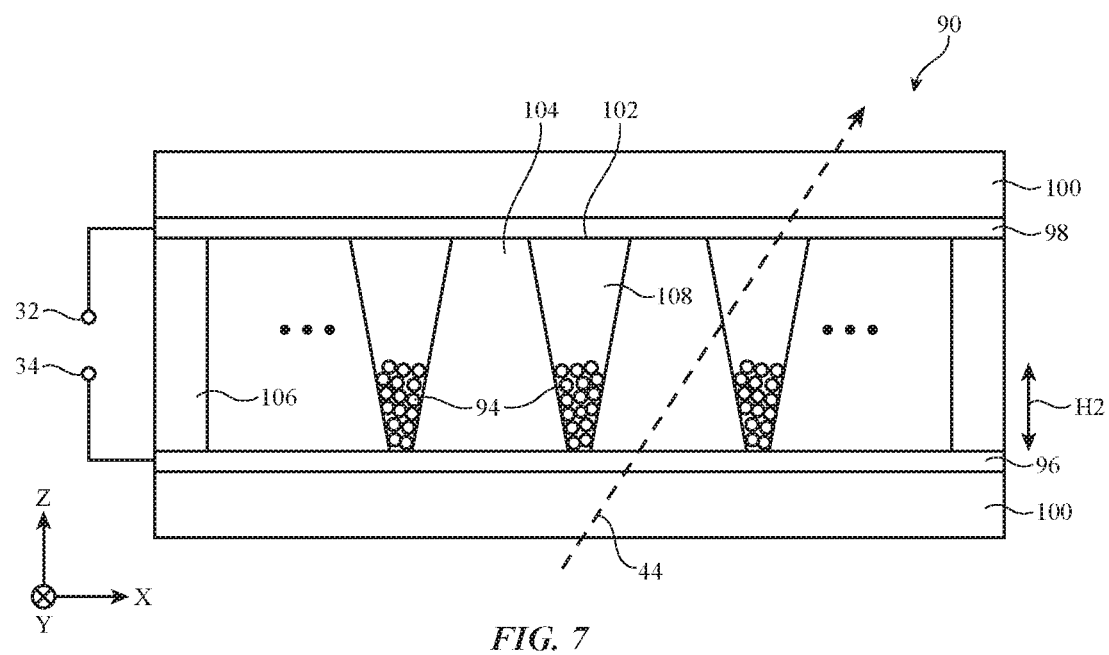
FIG. 7 is a cross-sectional side view of the angle-of-view adjustment layer of FIG. 6 in which the tapered light blocking structures are positioned in a wide angle-of-view state in accordance with an embodiment.

When it is desired to operate display 14 in normal or non-private mode, control circuitry 26 applies a voltage across terminals 32 and 34 to produce an electric field in layer 92. As shown in FIG. 7, this causes particles 94 to cluster towards lower electrode 96, reducing the height of light blocking structures 102 to height H2. Because of the taper shape of light blocking structures 102, particles 94 take up less space in the X and Y dimensions, thereby allowing more light through when display 14 is operated in normal viewing mode.

Figure 8:
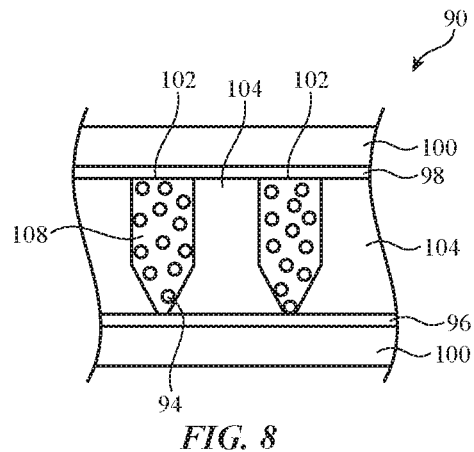
FIG. 8 is a cross-sectional side view of an illustrative angle-of-view adjustment layer having funnel-shaped light blocking structures that are positioned in a reduced angle-of-view state in accordance with an embodiment.
Figure 9:
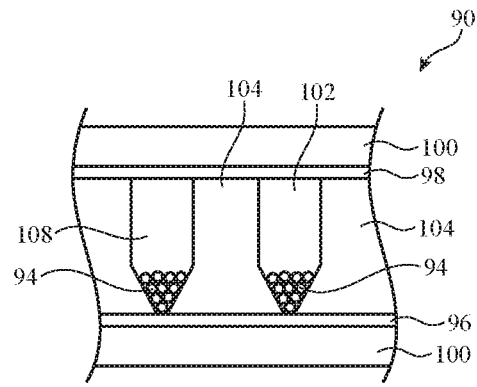
FIG. 9 is a cross-sectional side view of the angle-of-view adjustment layer of FIG. 8 in which the funnel-shaped light blocking structures are positioned in a wide angle-of-view state in accordance with an embodiment.

In the example of FIGS. 8 and 9, light blocking structures 102 have a funnel shape. As in the example of FIGS. 6 and 7, the width of light blocking structures 102 is greater near upper electrode 98 than it is near lower electrode 96. In this example, the upper portion of each light blocking structure 102 has straight vertical sides and the lower portion of each light blocking structure 102 has sloped sides that form a funnel shape. When light blocking structures 102 are operated in private viewing mode, as shown in FIG. 8, particles 94 disperse throughout medium 108 to restrict off-axis viewing. When light blocking structures 102 are operated in a normal viewing mode, particles 94 cluster in a small area near electrode 96 to ensure that wide viewing angles are not restricted by particles 94.

Figure 10:
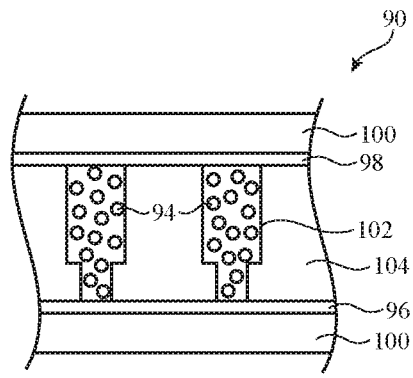
FIG. 10 is a cross-sectional side view of an illustrative angle-of-view adjustment layer having nozzle-shaped light blocking structures that are positioned in a reduced angle-of-view state in accordance with an embodiment.
Figure 11:
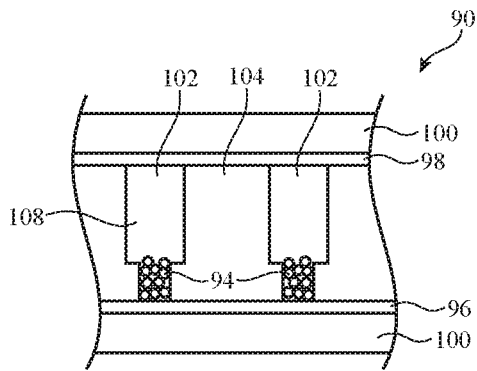
FIG. 11 is a cross-sectional side view of the angle-of-view adjustment layer of FIG. 10 in which the nozzle-shaped light blocking structures are positioned in a wide angle-of-view state in accordance with an embodiment.

In the example of FIGS. 10 and 11, light blocking structures 102 have a nozzle shape. The width of light blocking structures 102 is greater near upper electrode 98 than it is near lower electrode 96. In this example, each light blocking structure 102 has a narrower lower portion with straight vertical sides and a wider upper portion with straight vertical sides. If desired, light blocking structures 102 may have additional portions with wider or narrower widths (e.g., light blocking structures 102 may have three or more portions with progressively narrower widths). The example of FIGS. 10 and 11 is merely illustrative. When light blocking structures 102 are operated in a private viewing mode, as shown in FIG. 10, particles 94 disperse throughout medium 108 to restrict off-axis viewing. When light blocking structures 102 are operated in a normal viewing mode, particles 94 cluster in a small area near electrode 96 to ensure that wide viewing angles are not restricted by particles 94.

The example of FIGS. 6-11 in which particles 94 cluster towards lower electrode 96 is merely illustrative. If desired, electrode 98 may have opposite charge from that of particles 94 so that particles 94 migrate towards electrode 98 in normal viewing mode. In this type of arrangement, the shape of light blocking structure 102 may be reversed, so that the width of light blocking structure 102 is smaller near upper electrode 98 than it is near lower electrode 96.

Figure 12:
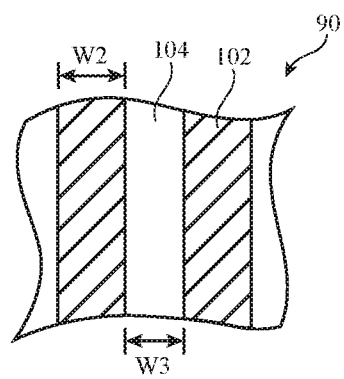
FIG. 12 is a top view of an illustrative angle-of-view adjustment layer of the type shown in FIGS. 6, 8, and 10 in which the adjustable light blocking structures are positioned in a reduced angle-of-view state in accordance with an embodiment.
Figure 13:
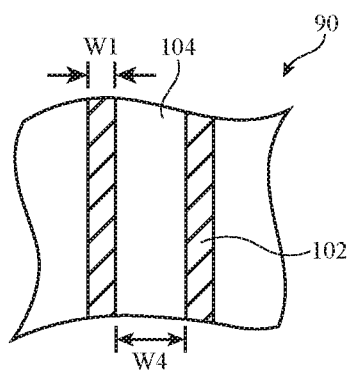
FIG. 13 is a top view of an illustrative angle-of-view adjustment layer of the type shown in FIGS. 7, 9, and 11 in which the adjustable light blocking structures are positioned in a wide angle-of-view state in accordance with an embodiment.

FIGS. 12 and 13 show top views of an illustrative angle-of-view adjustment layer 90 of the type shown in FIGS. 6-11. FIG. 12 shows angle-of view adjustment layer 90 in a private viewing mode state, and FIG. 13 shows angle-of-view adjustment layer 90 in a normal mode viewing state. As shown in FIG. 12, the wider upper width W2 of light blocking structures 102 restricts the transmissive area of layer 90 to width W3 when display 14 is operated in private viewing mode. As shown in FIG. 13, the narrower lower width W1 of light blocking structures 102 opens the transmissive area of layer 90 to width W4, which is greater than width W3.

FIGS. 14-17C show an illustrative arrangement for angle-of-view adjustment layer that employs multiple lower electrodes to further increase transmittance of display 14 when display 14 is operated in normal viewing mode. As shown in the top view of FIG. 14, angle-of-view adjustment layer 90 may have first electrodes 96-1 and second electrodes 96-2 formed on lower substrate 100. First electrodes 96-2 may be located along the sides of transmissive structures 104, whereas second electrodes 96-2 maybe located at the corners of transmissive structures 104. If desired, second electrodes 96-2 may occupy a smaller area on substrate 100 than first electrodes 96-1. This is, however, merely illustrative. Electrodes 96-1 and 96-2 may have any suitable shape, size, number, and location on substrate 100.

When display 14 is operated in normal viewing mode, an appropriate electric field may be applied to cause particles to cluster on electrodes 96-2. This leaves electrodes 96-1 uncovered by particles 94 and allows light to pass through first electrodes 96-1 when display 14 is operated in normal viewing mode.

Figure 14:
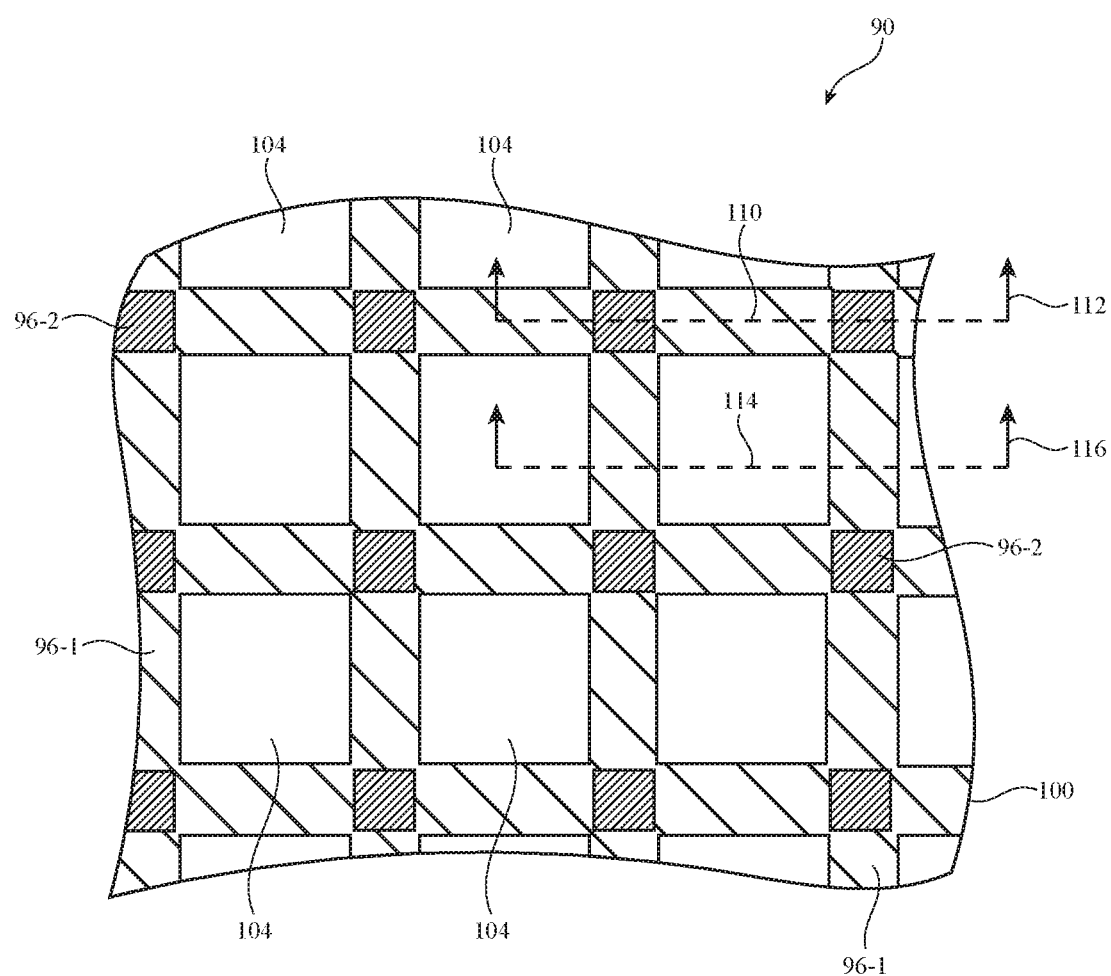
FIG. 14 is a top view of an illustrative angle-of-view adjustment layer having first and second electrodes on a substrate for increasing transmittance when the light blocking structures are positioned in a wide angle-of-view state in accordance with an embodiment.
Figure 15A:
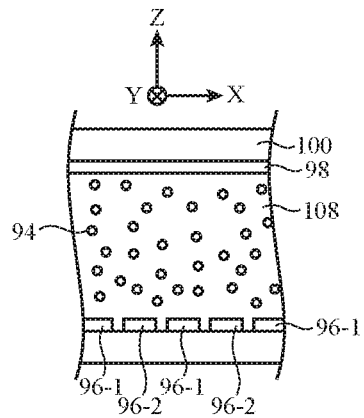
FIGS. 15A, 15B, and 15C are cross-sectional side views of a first region of an angle-of-view adjustment layer of the type shown in FIG. 14 when the light blocking structures are positioned in a reduced angle-of-view state, an intermediate state, and a wide angle-of-view state, respectively, in accordance with an embodiment.
Figure 15B:
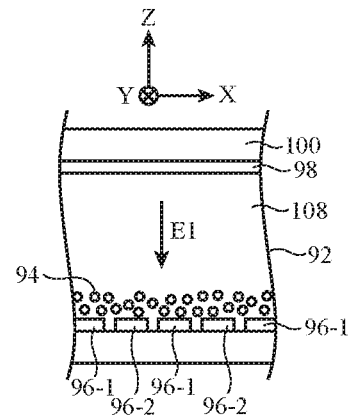
Figure 15C:
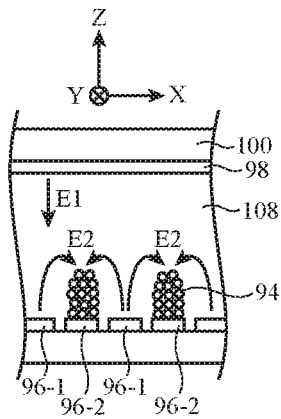

FIGS. 15A, 15B, and 15C are cross-sectional side views of angle-of-view adjustment layer 90 taken along line 110 and viewed in direction 112 of FIG. 14. These figures show the progression of particles 94 as particles 94 move from a private viewing mode state (FIG. 15A), to an intermediate state (FIG. 15B), to a normal viewing mode state (FIG. 15C).

As shown in FIG. 15A, the absence of an applied electric field causes particles 94 to disperse throughout medium 108, thereby restricting off-axis viewing of display 14.

When it is desired to switch into normal viewing mode, control circuitry 26 may apply a first electric field E1 across layer 92, as shown in FIG. 15B. This may be achieved by applying a first voltage (e.g., 20 Volts, for example) to lower electrodes 96-1 and 96-2 and applying a second voltage (e.g., 0 Volts, for example) to upper electrode 98. This causes particles 94 to move in dimension Z towards lower electrodes 96-1 and 96-2.

After particles 94 migrate to lower electrodes 96-1 and 96-2, control circuitry 26 may apply a second electric field E2 across layer 92, as shown in FIG. 15C. This may be achieved by applying a first voltage (e.g., 0 Volts, for example) to electrodes 98 and 96-1 and applying a second voltage (e.g., 20 Volts, for example) to electrodes 96-2. This causes particles 94 to cluster on second electrodes 96-2, leaving first electrodes 96-1 uncovered and able to transmit light in normal viewing mode.

Figure 16A:
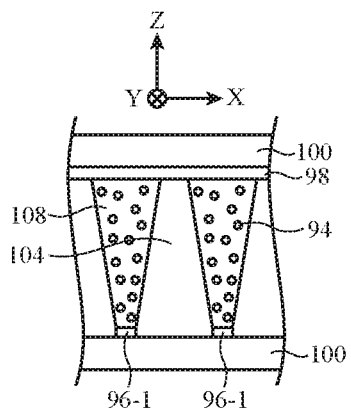
FIGS. 16A, 16B, and 16C are cross-sectional side views of a second region of an angle-of-view adjustment layer of the type shown in FIG. 14 when the light blocking structures are positioned in a reduced angle-of-view state, an intermediate state, and a wide angle-of-view state, respectively, in accordance with an embodiment.
Figure 16B:
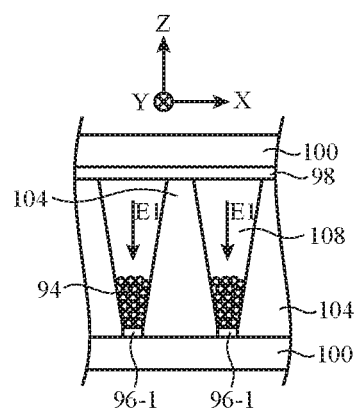
Figure 16C:
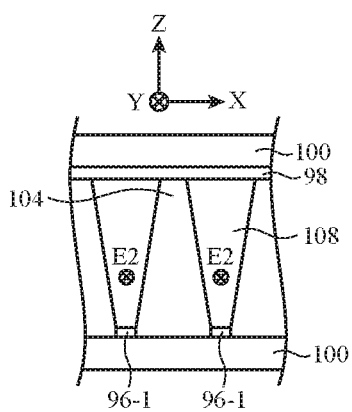

FIGS. 16A, 16B, and 16C are cross-sectional side views of angle-of-view adjustment layer 90 taken along line 114 and viewed in direction 116 of FIG. 14. Similar to FIGS. 15A, 15B, and 15C, these figures show the progression of particles 94 as particles 94 move from a private viewing mode state (FIG. 16A), to an intermediate state (FIG. 16B), to a normal viewing mode state (FIG. 16C).

As shown in FIG. 16A, the absence of an applied electric field causes particles 94 to disperse throughout medium 108, thereby restricting off-axis viewing of display 14.

When it is desired to switch into normal viewing mode, control circuitry 26 may apply a first electric field E1 across layer 92, as shown in FIG. 16B. This causes particles 94 to move along dimension Z towards lower electrodes 96-1 and 96-2.

After particles 94 migrate to lower electrodes 96-1 and 96-2, control circuitry 26 may apply a second electric field E2 across layer 92, as shown in FIG. 16C. This causes particles 94 to cluster on second electrodes 96-2 (as shown in FIG. 15C), leaving first electrodes 96-1 uncovered and able to transmit light in normal viewing mode.

Figure 17A:
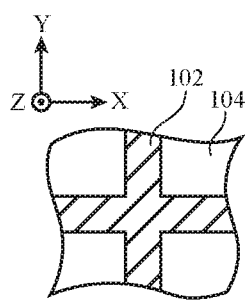
FIGS. 17A, 17B, and 17C are top views of an angle-of-view adjustment layer of the type shown in FIG. 14 when the light blocking structures are positioned in a reduced angleof-view state, an intermediate state, and a wide angle-of-view state in accordance with an embodiment.
Figure 17B:
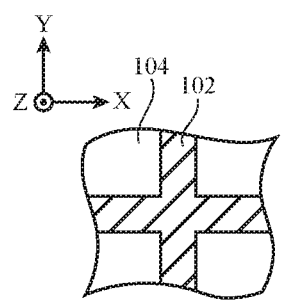
Figure 17C:
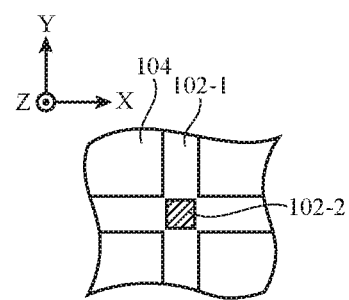

FIGS. 17A, 17B, and 17C show top views of light blocking structures 102 as particles 94 move from a private viewing mode state (FIG. 17A, which is a top view of FIGS. 15A and 16A), to an intermediate state (FIG. 17B, which is a top view of FIGS. 15B and 16B), to a normal viewing mode state (FIG. 17C, which is a top view of FIGS. 15C and 16C).

As shown in FIG. 17A, the absence of an applied electric field causes particles 94 to disperse throughout medium 108, thereby restricting off-axis viewing of display 14. In this state, light blocking structures 102 form a rectangular grid surrounding transmissive structures 104.

When it is desired to switch into normal viewing mode, control circuitry 26 may apply a first electric field E1 across layer 92, which causes particles 94 to move towards lower electrodes 96-1 and 96-2 (e.g., along the Z dimension of FIG. 17B).

After particles 94 migrate to lower electrodes 96-1 and 96-2, control circuitry 26 may apply a second electric field E2 across layer 92, causing particles 94 to move along dimensions X and Y towards second electrodes 96-2 (as shown in FIG. 15C). This means that regions 104 and 102-1, which overlap first electrodes 96-1, are transmissive, whereas regions 102-2, which overlap second electrodes 96-2, are non-transmissive. This ensures that transmittance of display 14 is not significantly reduced when display 14 is operated in a normal viewing mode.

Figure 18:
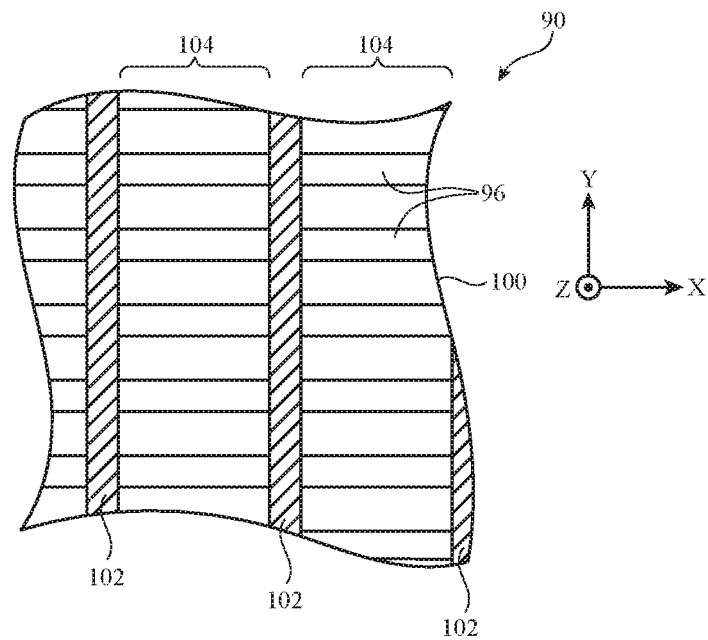
FIG. 18 is a top view of an illustrative angle-of-view adjustment layer having patterned electrodes and light blocking structures in a reduced angle-of-view state in accordance with an embodiment.

FIG. 18 shows another illustrative arrangement for an angle-of-view adjustment layer 90 that employs a pattern of lower electrodes to further increase transmittance of display 14 when display 14 is operated in normal viewing mode. As shown in the top view of FIG. 18, angle-of-view adjustment layer 90 may have a pattern of electrodes 96 on lower substrate 100. Electrodes 96 may be elongated strips that extend parallel to the X axis of FIG. 18, whereas light blocking structures 102 and light transmissive structures 104 extend parallel to the Y axis of FIG. 18. The example of FIG. 18 in which electrodes 96 form continuous, elongated strips is merely illustrative. If desired, electrodes 96 may be segmented, may be staggered, may follow a curved, angled, meandering, or random path, and/or may have any other suitable pattern.

As shown in FIG. 18, the absence of an applied electric field causes particles 94 to disperse throughout medium 108 (FIG. 3), thereby restricting off-axis viewing of display 14. In this state, light blocking structures 102 form elongated strips between light transmissive structures 104.

Figure 19:
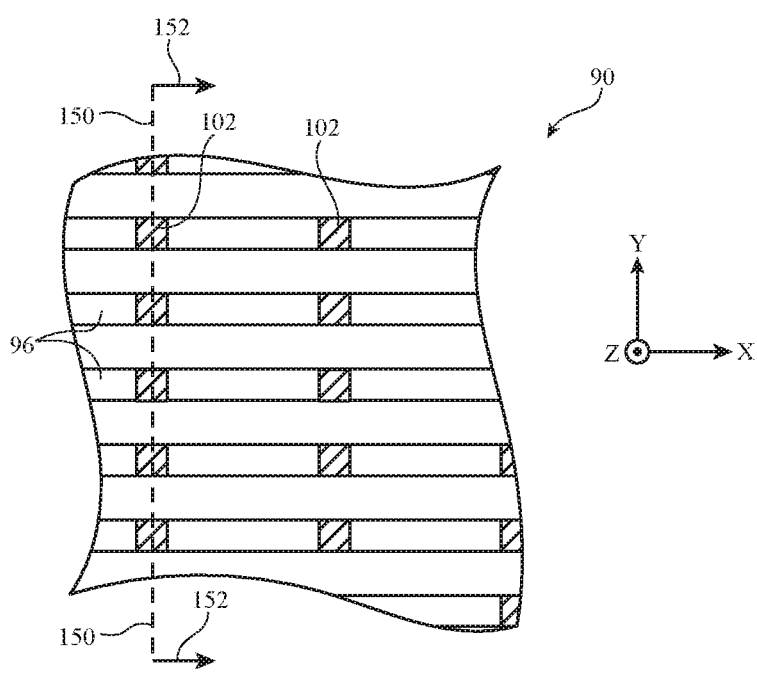
FIG. 19 is a top view of an illustrative angle-of-view adjustment layer having patterned electrodes and light blocking structures in a wide angle-of-view state in accordance with an embodiment.

When it is desired to switch into normal viewing mode, control circuitry 26 may apply an electric field across layer 92 (FIG. 3), which causes particles 94 to gather on electrodes 96, as shown in FIG. 19. The use of patterned electrodes 96 may therefore increase transmittance by allowing the spaces between electrodes 96 to be transparent in normal viewing mode.

Figure 20:
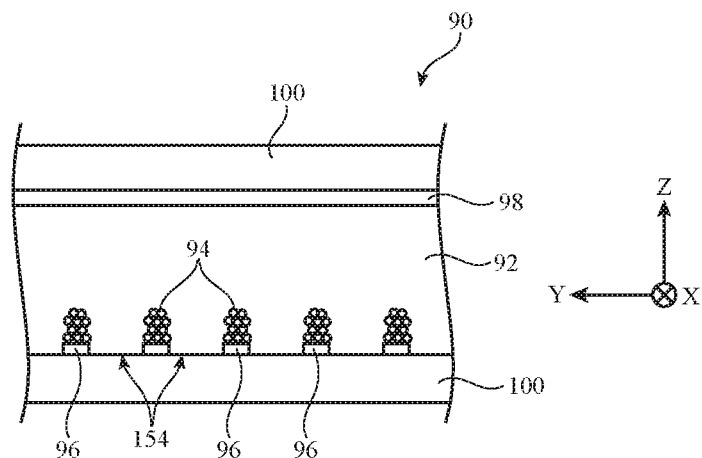
FIG. 20 is a cross-sectional side view of the angle-of-view adjustment layer of FIG. 19 showing how light blocking particles may gather on patterned electrodes when the display is operated in a normal viewing mode in accordance with an embodiment.

FIG. 20 is a cross-sectional side view of angle-of-view adjustment layer 90 of FIG. 19 taken along line 150 and viewed in direction 152. As shown in FIG. 20, particles 94 may accumulate on and be confined to patterned electrodes 96 on substrate 100 when control circuitry 26 applies an electric field across layer 92. This allows light from backlight 46 to be transmitted through gaps 154 between electrodes 96, thereby increasing the transmittance of layer 90 when display 14 is operated in normal viewing mode.

Figure 21:
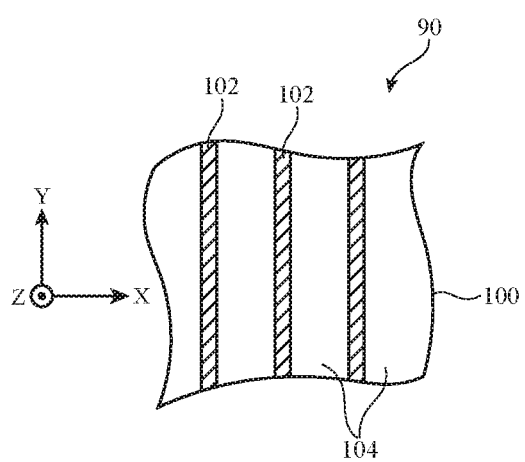
FIG. 21 is a top view of an illustrative angle-of-view adjustment layer having light blocking structures and light transmissive structures that form continuous, elongated strips in accordance with an embodiment.
Figure 22:
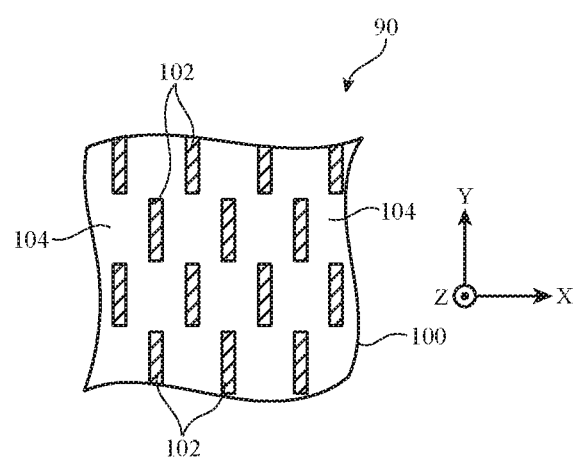
FIG. 22 is a top view of an illustrative angle-of-view adjustment layer having light blocking structures and light transmissive structures that form segmented, staggered strips in accordance with an embodiment.

FIG. 21 is a top view of angle-of-view adjustment layer 90 showing how light blocking structures 102 and light transmissive structures 104 may form elongated, continuous strips extending across substrate 100 parallel to the Y axis of FIG. 21. This is, however, merely illustrative. As shown in FIG. 22, light blocking structures 102 and light transmissive structures 104 may be segmented strips extending parallel to the Y axis of FIG. 22. In general, any suitable pattern of light blocking structures 102 and light transmissive structures 104 may be used in display 14. The examples of FIGS. 21 and 22 are merely illustrative.

Figure 23:
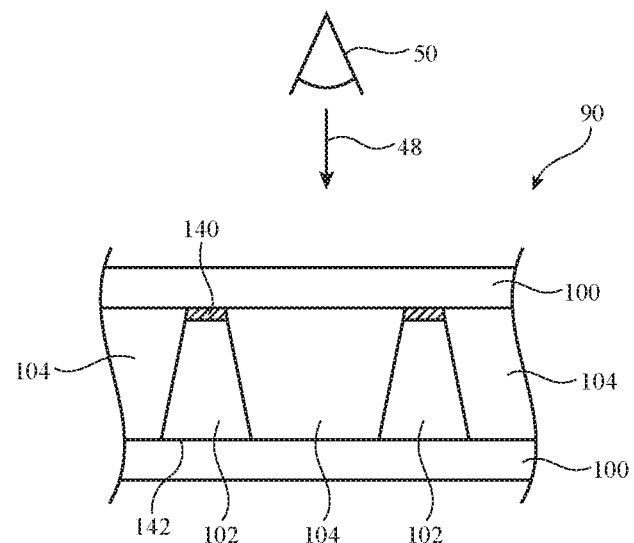
FIG. 23 is a cross-sectional side view of an illustrative angle-of-view adjustment layer having tapered light blocking structures with a narrow end facing toward viewers in accordance with an embodiment.
Figure 24:
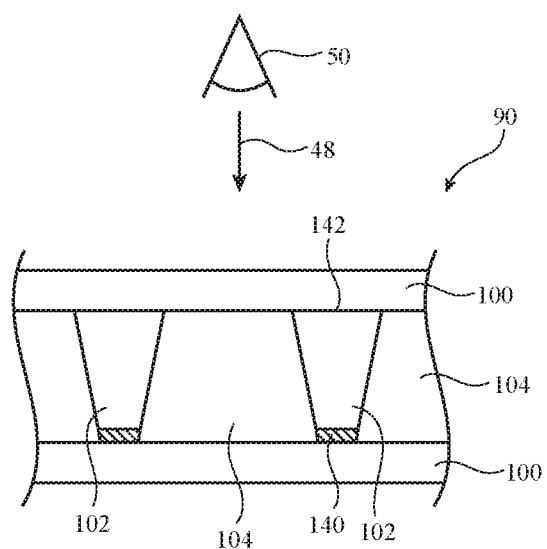
FIG. 24 is a cross-sectional side view of an illustrative angle-of-view adjustment layer having tapered light blocking structures with a narrow end facing away from viewers in accordance with an embodiment.

FIG. 23 is a cross-sectional side view of angle-of-view adjustment layer 90 showing how the narrower end such as narrow end 140 of light blocking structures 102 may face viewer 50 and the wider end such as wider end 142 of light blocking structures 102 may face backlight 42 (FIG. 3). Placing narrow end 140 towards viewer 50 and wider end 142 towards backlight 42 may help increase transmittance of layer 90 when display 14 is operated in normal viewing mode. This is, however, merely illustrative. If desired, layer 90 may have an arrangement of the type shown in FIG. 24, in which narrow end 140 faces backlight 42 (FIG. 3) and wider end 142 faces viewer 50.

Figure 25:
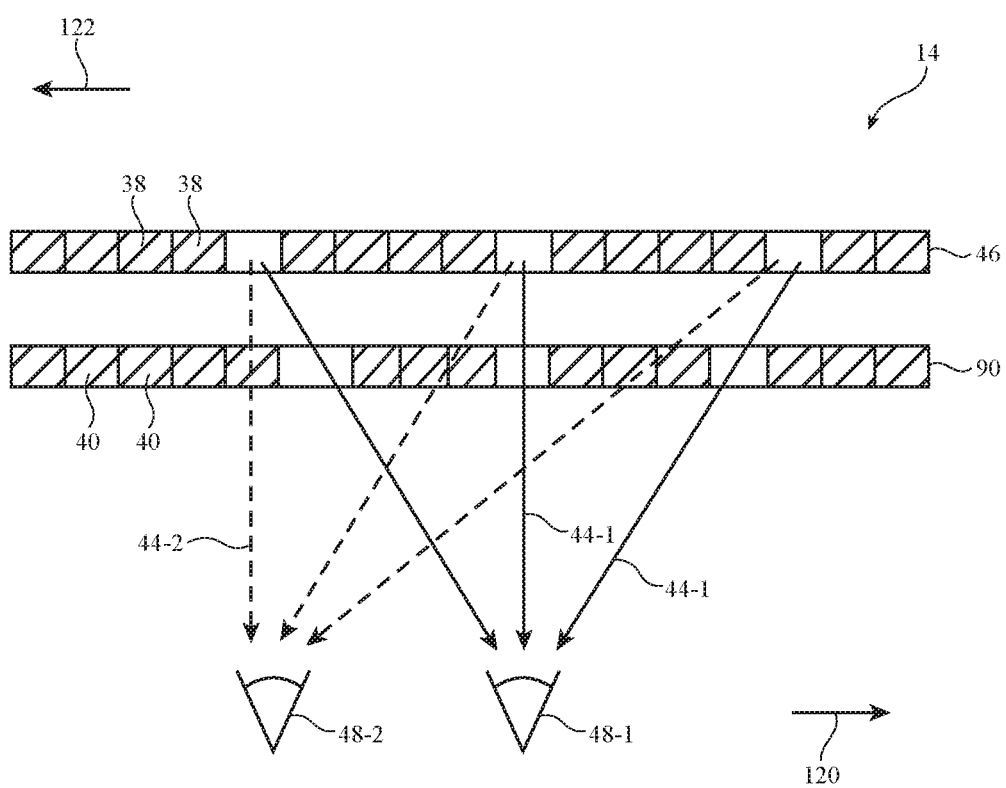
FIG. 25 is a cross-sectional side view of an illustrative display having a first display module for providing display content and a second display module for adjusting the angle of view of the display content in accordance with an embodiment.

If desired, angle-of-view adjustment layer 90 may be implemented using liquid crystal display structures. An arrangement of this type is shown in FIG. 25. As shown in FIG. 25, display layers 46 may include pixels 38 and angle-of-view adjustment layer 90 may include pixels 40. Pixels 40 may be liquid crystal pixels having a layer of liquid crystal material interposed between transparent electrodes. Control circuitry 26 may control the operation of layer 90 by applying controlled amounts of electric field to the liquid crystal layer using the electrodes.

Display layers 46 may be used to provide display content and angle-of-view adjustment layer 90 may be used to adjust the angles at which the display content is viewable. As shown in FIG. 25, for example, select pixels 38 and pixels 40 may be activated to transmit on-axis light towards viewer 48-1, whereas other pixels 38 and pixels 40 may be inactivated to block off-axis light from reaching viewer 48-2. If desired, control circuitry 26 may use head tracking system 30 to track the head or eyes of viewer 48-1 and to adjust the direction of light according to the location of the user's head. For example, if system 30 detects movement of viewer 48-1 in direction 120, control circuitry 46 may shift activated pixels 38 in direction 122 and/or may shift activated pixels 40 in direction 120.

Figure 26:
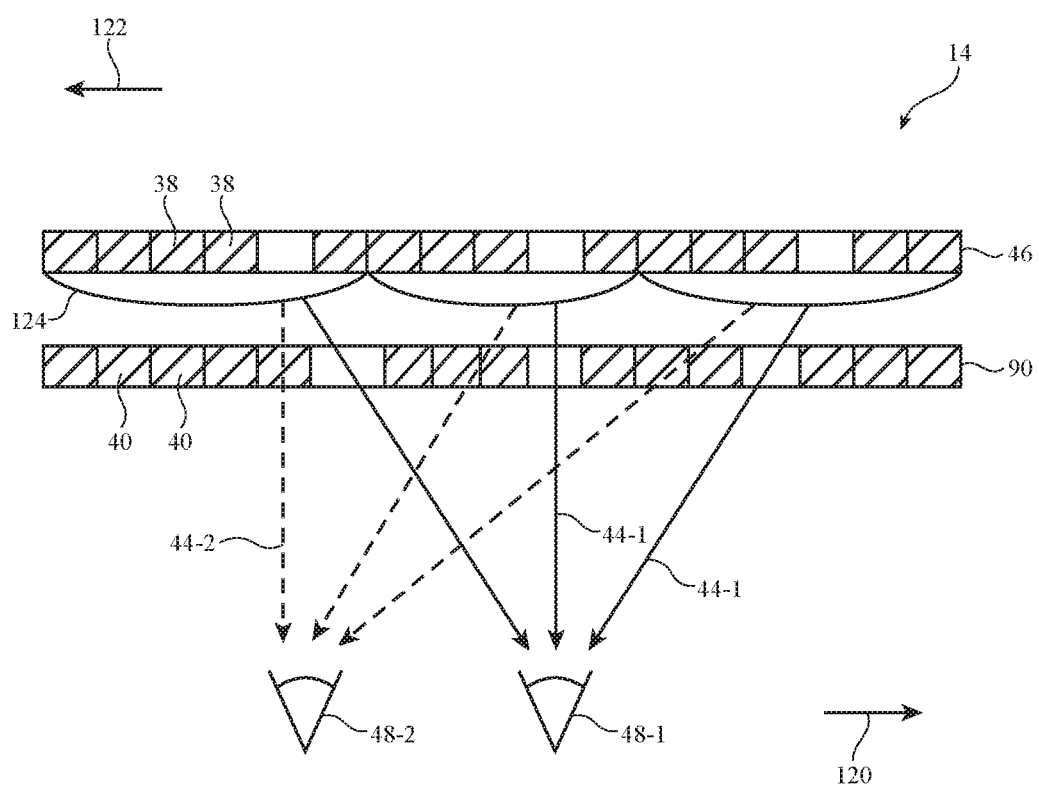
FIG. 26 is a cross-sectional side view of an illustrative display having a first display module for providing display content, a lenticular lens array for adjusting the direction of the display content, and a second display module for selectively blocking some of the display content in accordance with an embodiment.

FIG. 26 shows an illustrative arrangement in which angle-of-view adjustment layer 90 is implemented in combination with a lens array such as lenticular lenses 124. As in the example of FIG. 25, display layers 46 may be used to provide display content and angle-of-view adjustment layer 90 may be used to adjust the angles at which the display content is viewable. Lenticular lenses 124 may be used to bend light from display layers 46 to help steer light to the appropriate viewer. For example, select pixels 38 and pixels 40 may be activated to transmit on-axis light towards viewer 48-1, whereas other pixels 38 and pixels 40 may be inactivated to block off-axis light from reaching viewer 48-2. Lenticular lenses 124 may be used to help steer light 44-1 towards viewer 48-1. This additional steering helps block off extreme wide viewing angles that might otherwise be viewable on display 14. If desired, control circuitry 26 may use head tracking system 30 to track the head or eyes of viewer 48-1 and to adjust the direction of light according to the location of the user's head. For example, if system 30 detects movement of viewer 48-1 in direction 120, control circuitry 46 may shift activated pixels 38 in direction 122 and/or may shift activated pixels 40 in direction 120.

If desired, display 14 may achieve adjustable angle of view using a directional backlight in conjunction with a lenticular lens array. In this type of arrangement, only one display module (e.g., display layers 46) is needed, although more may be used if desired. The backlight may be a two-dimensional backlight (e.g., a two-dimensional array of light sources that overlap display layers 46). Control circuitry 26 may adjust the angle of view by adjusting the directional backlight so that light reaches on-axis viewers and is blocked from off-axis viewers when display 14 is operated in private mode. If desired, control circuitry 26 may use head tracking system 30 to track the head or eyes of viewer 48-1 and to adjust the direction of light according to the location of the user's head.

Figure 27:
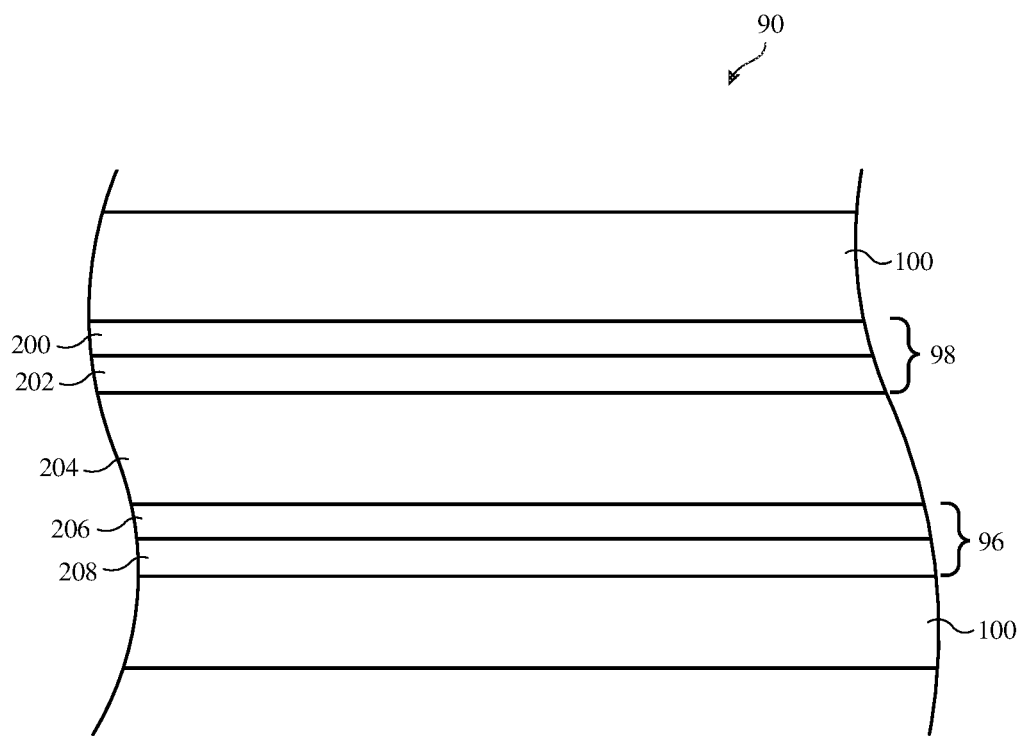
FIG. 27 is a cross-sectional side view of an illustrative angle-of-view adjustment layer having electrochromic layers in accordance with an embodiment.

FIG. 27 is a cross-sectional side view of an illustrative arrangement in which angle-of-view adjustment layer 90 includes electrochromic materials (e.g., in addition to or instead of electrophoretic particles). As shown in FIG. 27, angle-of-view adjustment layer 90 may include electrodes 98 and 96 on respective transparent substrates 100. Each electrode may include an electrode layer and a metal oxide coating. For example, electrode 98 (sometimes referred to as a counter electrode) may include electrode layer 200 (e.g., indium tin oxide or other suitable transparent conductive layer) that is coated with metal oxide coating 202 (e.g., $Li_xNiO$ or other suitable metal oxide coating). Electrode 96 (sometimes referred to as a working electrode) may include electrode layer 208 (e.g., indium tin oxide or other suitable transparent conductive layer) that is coated with electrochromic coating 206 (e.g., tungsten oxide, molybdenum oxide, titanium oxide, niobium oxide, or other suitable electrochromic coating). An electrolyte such as electrolyte layer 204 may be interposed between electrodes 98 and 96. Electrolyte layer 204 may be formed from LiNiOP (e.g., a gel electrolyte containing lithium ions) or may be formed from any other suitable electrolyte.

Control circuitry 26 may apply a voltage to layers 200 and 208, which in turn will either cause electrochromic material 206 to lighten or darken. The switch between light and dark states happens by pushing ions into or pulling ions out of the electrochromic material. For example, when tungsten oxide is used as electrochromic material 206 and it is desired to operate display 14 in private mode, control circuitry 26 may apply an appropriate voltage to layer 200 and 208 that pushes lithium ions into the tungsten oxide, thereby darkening electrochromic material 206 and making at least a portion of layer 90 opaque or otherwise less transparent. When it is desired to operate display 14 in normal mode or public viewing mode, control circuitry 26 will apply an appropriate voltage to layers 200 and 208 that causes lithium ions to be pulled out of electrochromic material 206, thereby lightening electrochromic material 206 and making layer 90 transparent. This is, however, merely illustrative. If desired, other types of electrochromic materials may be used, which may undergo different oxidation-reduction reactions to achieve light and dark states.

Figure 28:
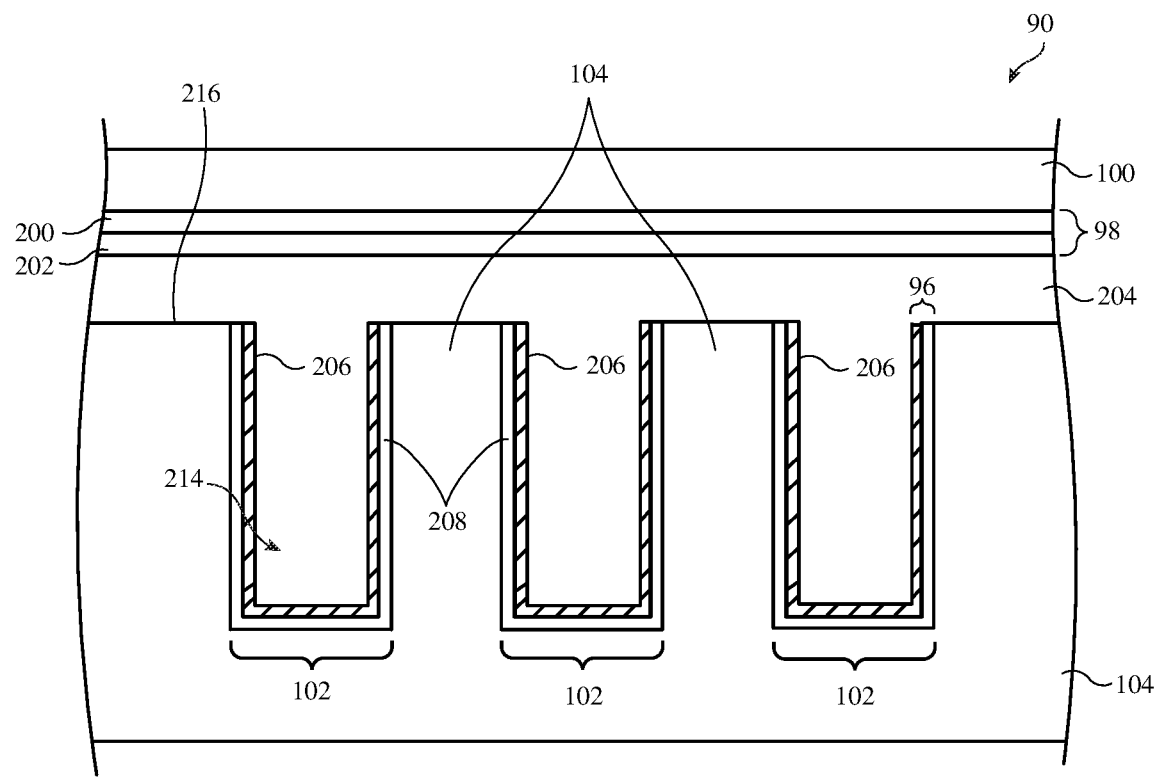
FIG. 28 is a cross-sectional side view of an illustrative angle-of-view adjustment layer in which the electrochromic layers of FIG. 27 are located on a transparent polymer layer having trenches in accordance with an embodiment.

FIG. 28 is a cross-sectional side view of an illustrative arrangement in which the layers of FIG. 27 are formed on a transparent polymer layer having a series of trenches. As shown in FIG. 28, transparent polymer 104 may be embossed, photolithographically patterned, or otherwise formed to have a series of trenches such as trenches 214. The walls of trenches 214 may be coated with light blocking structures 102 formed from electrochromic material 206 and conductive layer 208. Transparent polymer structures 104 between trenches 214 may have a wall shape (e.g., similar to that of FIG. 4), may have a rod or pillar shape (e.g., similar to that of FIG. 5), or may have other suitable shape. Configurations in which transparent polymer structures 104 have rod or pillar shapes may allow for light blocking structures 102 to extend along two dimensions so that both the vertical field of view and the horizontal field of view of display 14 can be modified. Transparent polymer structures 104 between trenches 214 may be straight (as shown in the example of FIG. 28) or may be sloped (e.g., as in the example of FIG. 6).

Electrolyte layer 204 may be coated or otherwise deposited on upper surface 216 of polymer layer 104 and in trenches 214. Counter electrode 98 (including electrode layer 200 and coating layer 202) may be interposed between substrate 100 and electrolyte layer 204.

If desired, layers 208 and 206 may be patterned so that light blocking structures 102 in trenches 214 are individually addressable. For example, a blanket coating of conductive layer 208 and electrochromic material 206 may be deposited on upper surface 216 of polymer layer 104 (e.g., via sputtering or other suitable deposition method) and subsequently patterned (e.g., via chemical-mechanical polishing or other patterning technique) to remove portions of conductive layer 208 and electrochromic material 206 in the regions between trenches 214. Electrode 96 may be patterned to form an array of parallel strips (e.g., in arrangements where light blocking structures 102 extend along one dimension) or may be patterned to form a grid of horizontal and vertical lines (e.g., in arrangements where light blocking structures 102 extend along two dimensions).

When it is desired to operate display 14 in private viewing mode, control circuitry 26 will apply a voltage to layers 200 and 208 that causes ions to be pushed into or pulled out of electrochromic material 206 (depending on the type of electrochromic material used), thereby making at least a portion of layer 90 opaque or otherwise less transparent. This restricts the field of view of display 14 to a first range of angles, as discussed in connection with FIG. 3. When it is desired to operate display 14 in normal mode or public viewing mode, control circuitry 26 will apply a voltage to layers 200 and 208 that causes electrochromic material 206 to lighten, thereby making layer 90 transparent. This opens up the field of view of display 14 to a second range of angles that is larger than the first range.

Figure 29:
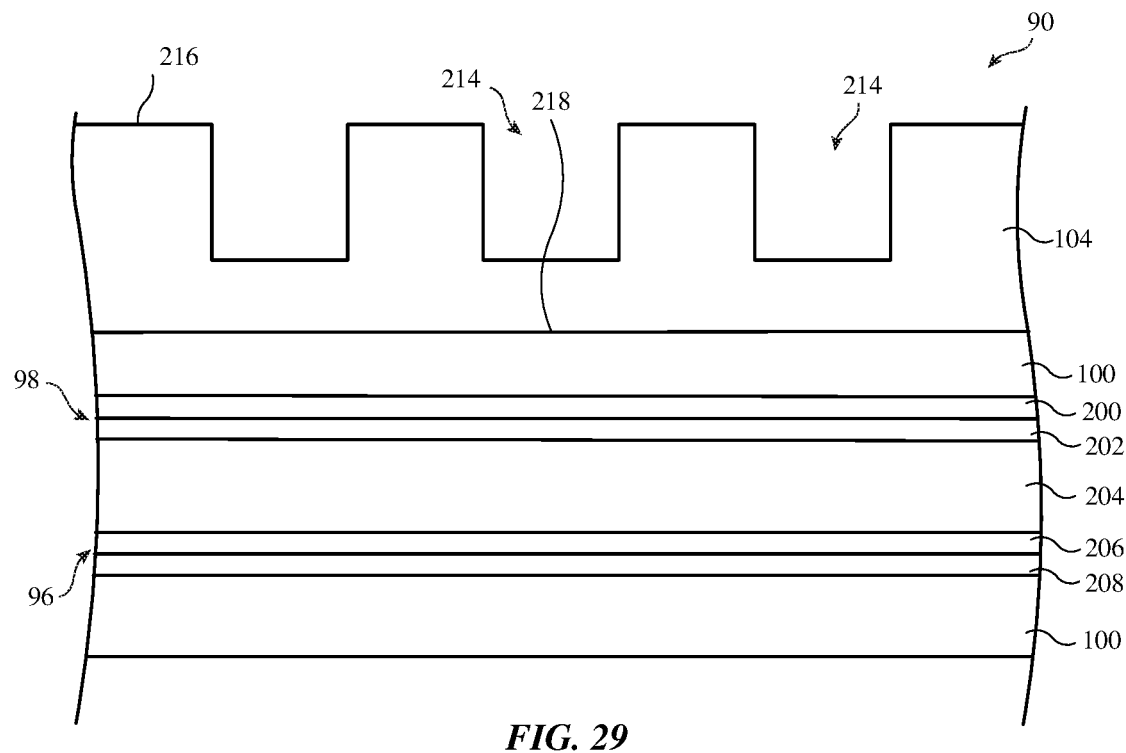
FIG. 29 is a cross-sectional side view of an illustrative angle-of-view adjustment layer in which the electrochromic layers of FIG. 27 are located on a lower surface of a transparent polymer layer having trenches in accordance with an embodiment.

The example of FIG. 28 in which electrochromic layers are formed on upper surface 216 and in trenches 214 of polymer layer 104 is merely illustrative. If desired, the electrochromic layers may be laminated to a rear surface to transparent layer 104, as shown in FIG. 29. With this type of arrangement, the layers of FIG. 27 are attached to rear surface 218 of transparent polymer 104. Trenches 214 may be left uncoated and unfilled, may be coated with additional electrochromic materials, may be filled with electrophoretic particles, black ink, or other opaque materials, may be filled with transparent polymer or other transparent materials, and/or may be omitted, if desired.

The foregoing is merely illustrative and various modifications can be made to the described embodiments. The foregoing embodiments may be implemented individually or in any combination.

What is claimed is:

1. A display, comprising:
a pixel array configured to display an image; and
an angle-of-view adjustment layer that transmits backlight to the pixel array, wherein the angle-of-view adjustment layer comprises adjustable light blocking structures formed from electrochromic material, wherein the adjustable light blocking structures are individually addressable, wherein the angle-of-view adjustment layer comprises pillars of transparent polymer surrounded by trenches, and wherein the electrochromic material is located in the trenches surrounding each of the pillars.

2. The display defined in claim 1 wherein the electrochromic material comprises a patterned electrochromic coating.

3. The display defined in claim 2 wherein the transparent polymer is located between the adjustable light blocking structures.

4. The display defined in claim 3 wherein the angle-of-view adjustment layer comprises first and second transparent conductive layers and wherein the electrochromic material is interposed between the first and second transparent conductive layers.

5. The display defined in claim 4 wherein the angle-of-view adjustment layer comprises an electrolyte interposed between the first and second transparent conductive layers.

6. The display defined in claim 5 wherein the electrochromic material comprises tungsten oxide and the electrolyte comprises lithium ions.

7. The display defined in claim 6 further comprising control circuitry that applies a current to the first and second transparent conductive layers to adjust an opacity of the electrochromic material.

8. The display defined in claim 4 wherein at least one of the first and second transparent conductive layers is patterned to form parallel strips.

9. The display defined in claim 4 wherein the angle-of-view adjustment layer is operable in a first state that restricts a field of view of the display to a first range of angles and a second state that opens up the field of view of the display to a second range of angles and wherein the electrochromic material is darkened in the first state and lightened in the second state.

10. The display defined in claim 3 wherein the transparent polymer has sloped sides.

11. The display defined in claim 3 wherein the transparent polymer has straight sides that abut each adjustable light blocking structure.

12. A display, comprising:
an array of pixels; and
an angle-of-view adjustment layer that transmits backlight to the array of pixels, wherein the angle-of-view adjustment layer is operable in a private viewing mode in which the angle-of-view adjustment layer restricts an angle of view of the display to a first range of angles and a normal viewing mode in which the angle-of-view adjustment layer opens the angle of view of the display to a second range of angles that is larger than the first range of angles, the angle-of-view adjustment layer comprising:
a first electrode layer on a first substrate;
a second electrode layer on a second substrate; and
electrochromic material between the first and second substrates, wherein the electrochromic material is opaque when the angle-of-view adjustment layer is operated in the private viewing mode and transparent when the angle-of-view adjustment layer is operated in the normal viewing mode, wherein the angle-of-view adjustment layer comprises pillars of transparent polymer between the first and second substrates, and wherein the electrochromic material surrounds each of the pillars.

13. The display defined in claim 12 wherein the electrochromic material is interposed between the pillars of transparent polymer.

14. The display defined in claim 12 wherein the electrochromic material comprises a patterned electrochromic coating.

15. The display defined in claim 14 wherein the angle-of-view adjustment layer comprises an electrolyte interposed between the first and second electrode layers.

16. The display defined in claim 15 wherein the electrochromic material comprises tungsten oxide and the electrolyte comprises lithium ions.

17. An electronic device, comprising:
an array of pixels;
control circuitry; and
an angle-of-view adjustment layer that transmits backlight to the array of pixels, wherein the angle-of-view adjustment layer comprises:
pillars of transparent polymer surrounded by trenches;
first and second electrode layers;
a patterned coating of electrochromic material on the second electrode layer, wherein the patterned coating of electrochromic material and the second electrode layer each have individually addressable portions in the trenches surrounding each of the pillars; and
an electrolyte interposed between the electrochromic material and the first electrode layer, wherein the control circuitry applies a current to the first and second electrode layers to adjust an opacity of the electrochromic material.

* * * * *